(12) United States Patent
Birau et al.

(10) Patent No.: US 10,323,154 B2
(45) Date of Patent: Jun. 18, 2019

(54) WHITE INK COMPOSITION FOR INK-BASED DIGITAL PRINTING

(71) Applicant: XEROX CORPORATION, Norwalk, CT (US)

(72) Inventors: Mihaela Maria Birau, Mississauga (CA); C. Geoffrey Allen, Waterdown (CA); Aurelian Valeriu Magdalinis, Aurora (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/619,820

(22) Filed: Feb. 11, 2015

(65) Prior Publication Data
US 2016/0230027 A1  Aug. 11, 2016

(51) Int. Cl.
| | | |
|---|---|---|
| C09D 11/037 | (2014.01) | |
| C09D 11/101 | (2014.01) | |
| C09D 11/02 | (2014.01) | |
| C08K 3/22 | (2006.01) | |

(52) U.S. Cl.
CPC ............... *C09D 11/02* (2013.01); *C08K 3/22* (2013.01); *C09D 11/037* (2013.01); *C09D 11/101* (2013.01); *C08K 2003/2241* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | |
|---|---|---|
| 3,945,957 A | 3/1976 | Noshiro et al. |
| 4,304,601 A | 12/1981 | Sharp |
| 4,403,550 A | 9/1983 | Sharp |

(Continued)

FOREIGN PATENT DOCUMENTS

| | | |
|---|---|---|
| EP | 1235863 B1 | 1/2005 |
| JP | 03069954 A | 3/1991 |

(Continued)

OTHER PUBLICATIONS

Thesis of Enrique Michel-Sanchez, Impact of Particle Morphology on the Rheology of PCC-Based Coatings, Aug. 2005.*

(Continued)

*Primary Examiner* — Joshua D Zimmerman
(74) *Attorney, Agent, or Firm* — MH2 Technology Law Group LLP

(57) ABSTRACT

The present disclosure is directed to a white ink composition for use in digital offset printing, including a first white colorant including a first plurality of white pigment particles, wherein an average diameter of at least about 40% of the first plurality of white pigment particles is in a range of about 250 nanometers to about 350 nanometers, a second white colorant including a second plurality of white pigment particles, wherein an average diameter of at least about 40% of the second plurality of white pigment particles is in a range of about 350 nanometers to about 550 nanometers, at least one dispersant, at least one component selected from a curable monomer or a curable oligomer, and a photo-initiator. Also provided is a method of digital offset printing using the white ink composition of the present disclosure.

17 Claims, 3 Drawing Sheets

(56) References Cited

U.S. PATENT DOCUMENTS

| | | |
|---|---|---|
| 4,445,432 A | 5/1984 | Ford, Jr. et al. |
| 4,711,818 A | 12/1987 | Henry |
| 4,806,391 A | 2/1989 | Shorin |
| 4,911,999 A | 3/1990 | Legere |
| 4,927,180 A | 5/1990 | Trundle et al. |
| 5,085,698 A | 2/1992 | Ma et al. |
| 5,502,476 A | 3/1996 | Neal et al. |
| 5,834,118 A | 11/1998 | Ranby et al. |
| 5,886,067 A | 3/1999 | Li et al. |
| 5,977,202 A | 11/1999 | Chawla et al. |
| 6,114,489 A | 9/2000 | Vicari et al. |
| 6,140,392 A | 10/2000 | Kingman et al. |
| 6,239,189 B1 | 5/2001 | Narayan et al. |
| 6,329,446 B1 | 12/2001 | Sacripante et al. |
| 6,348,561 B1 | 2/2002 | Mychajlowskij et al. |
| 6,664,015 B1 | 12/2003 | Sacripante |
| 6,896,937 B2 | 5/2005 | Woudenberg |
| 7,022,752 B2 | 4/2006 | Hayashi et al. |
| 7,151,153 B2 | 12/2006 | Bruchmann et al. |
| 7,202,006 B2 | 4/2007 | Chopra et al. |
| 7,208,258 B2 | 4/2007 | Gervasi et al. |
| 7,322,688 B2 | 1/2008 | Woudenberg |
| 7,538,070 B2 | 5/2009 | Iftime et al. |
| 7,556,844 B2 | 7/2009 | Iftime et al. |
| 7,674,326 B2 | 3/2010 | Iftime et al. |
| 7,708,396 B2 | 5/2010 | Iftime et al. |
| 7,718,325 B2 | 5/2010 | Norsten et al. |
| 7,723,398 B2 | 5/2010 | Ilg et al. |
| 7,909,924 B2 | 3/2011 | Krishnan et al. |
| 7,964,271 B2 | 6/2011 | Norsten et al. |
| 8,001,889 B2 | 8/2011 | Gaugenrieder et al. |
| 8,124,791 B2 | 2/2012 | Shinjo et al. |
| 8,158,693 B2 | 4/2012 | Breton et al. |
| 8,222,313 B2 | 7/2012 | Iftime et al. |
| 8,771,787 B2 | 7/2014 | Breton et al. |
| 8,895,400 B2 | 11/2014 | Seo et al. |
| 8,934,823 B1 | 1/2015 | Pickering et al. |
| 9,011,594 B1 | 4/2015 | Kanungo et al. |
| 9,193,209 B2 | 11/2015 | Dooley et al. |
| 9,283,795 B1 | 3/2016 | Kanungo et al. |
| 9,359,512 B2 | 6/2016 | Moorlag et al. |
| 9,387,661 B2 | 7/2016 | Zirilli |
| 9,422,436 B2 | 8/2016 | Birau et al. |
| 2002/0040073 A1 | 4/2002 | Stone et al. |
| 2002/0107303 A1 | 8/2002 | Miyabashi et al. |
| 2003/0003323 A1 | 1/2003 | Murakami |
| 2003/0018100 A1 | 1/2003 | Foucher et al. |
| 2003/0021961 A1 | 1/2003 | Ylitalo et al. |
| 2003/0044691 A1 | 3/2003 | Setthachayanon et al. |
| 2003/0073762 A1 | 4/2003 | Jung et al. |
| 2003/0149130 A1 | 8/2003 | Kondo |
| 2003/0187098 A1 | 10/2003 | Chen et al. |
| 2004/0009363 A1 | 1/2004 | Shouldice et al. |
| 2004/0063809 A1 | 4/2004 | Fu et al. |
| 2004/0132862 A1 | 7/2004 | Woudenberg |
| 2004/0233465 A1 | 11/2004 | Coyle |
| 2005/0166783 A1* | 8/2005 | Ylitalo ................. B41M 5/0011 101/494 |
| 2006/0054040 A1 | 3/2006 | Daems et al. |
| 2006/0110611 A1 | 5/2006 | Badesha et al. |
| 2007/0073762 A1 | 3/2007 | Adamson et al. |
| 2007/0166479 A1 | 7/2007 | Drake et al. |
| 2007/0257976 A1 | 11/2007 | Takabayashi |
| 2007/0259986 A1 | 11/2007 | Elwakil et al. |
| 2008/0090929 A1 | 4/2008 | Wilson et al. |
| 2008/0139743 A1 | 6/2008 | Krishnan et al. |
| 2008/0241485 A1 | 10/2008 | Shimohara et al. |
| 2008/0258345 A1 | 10/2008 | Bens et al. |
| 2008/0317957 A1 | 12/2008 | Overbeek et al. |
| 2009/0038506 A1 | 2/2009 | Odell et al. |
| 2009/0110843 A1 | 4/2009 | Halahmi et al. |
| 2009/0135239 A1 | 5/2009 | Chretien et al. |
| 2009/0280302 A1 | 11/2009 | Fukumoto et al. |
| 2010/0016513 A1 | 1/2010 | Hartmann et al. |
| 2010/0020123 A1 | 1/2010 | Hirato |
| 2010/0067056 A1 | 3/2010 | Rich et al. |
| 2010/0214373 A1 | 8/2010 | Carr et al. |
| 2010/0239777 A1 | 9/2010 | Nakajimi et al. |
| 2010/0304040 A1 | 12/2010 | Chretien et al. |
| 2011/0045199 A1 | 2/2011 | Cong |
| 2011/0141187 A1 | 6/2011 | Takabayashi |
| 2011/0188023 A1 | 8/2011 | Rondon et al. |
| 2011/0196058 A1 | 8/2011 | Breton et al. |
| 2011/0243629 A1 | 10/2011 | Roberts et al. |
| 2011/0262711 A1 | 10/2011 | Chopra et al. |
| 2012/0040156 A1 | 2/2012 | Ohashi et al. |
| 2012/0103212 A1 | 5/2012 | Stowe et al. |
| 2012/0103213 A1 | 5/2012 | Stowe |
| 2012/0103218 A1 | 5/2012 | Stowe et al. |
| 2012/0103221 A1 | 5/2012 | Stowe et al. |
| 2012/0157561 A1 | 6/2012 | Gould et al. |
| 2012/0309896 A1 | 12/2012 | Carlini et al. |
| 2013/0050366 A1 | 2/2013 | Sasada et al. |
| 2013/0085208 A1* | 4/2013 | Norikoshi ................ C08L 63/00 523/434 |
| 2013/0104756 A1 | 5/2013 | Stowe et al. |
| 2013/0305946 A1 | 11/2013 | Iftime et al. |
| 2013/0305947 A1 | 11/2013 | Iftime et al. |
| 2013/0307913 A1 | 11/2013 | Kawashima et al. |
| 2013/0310479 A1 | 11/2013 | Lee et al. |
| 2013/0310517 A1 | 11/2013 | Lee et al. |
| 2013/0324653 A1 | 12/2013 | Bollard et al. |
| 2014/0235752 A1 | 8/2014 | Gharapetian et al. |
| 2014/0333704 A1 | 11/2014 | Takabayashi et al. |
| 2014/0340455 A1 | 11/2014 | Breton et al. |
| 2015/0077501 A1 | 3/2015 | Breton et al. |
| 2015/0093690 A1* | 4/2015 | Shimura ................. G03F 7/028 430/18 |
| 2015/0116416 A1 | 4/2015 | Belelie et al. |
| 2015/0170498 A1 | 6/2015 | Beggs et al. |
| 2015/0174887 A1 | 6/2015 | Moorlag et al. |
| 2015/0175820 A1 | 6/2015 | Breton et al. |
| 2015/0175821 A1 | 6/2015 | Moorlag et al. |
| 2016/0090490 A1 | 3/2016 | Moorlag et al. |
| 2016/0176185 A1 | 6/2016 | Kanungo et al. |
| 2016/0222231 A1 | 8/2016 | Allen et al. |
| 2016/0237290 A1 | 8/2016 | Moorlag et al. |
| 2016/0257829 A1 | 9/2016 | Breton et al. |
| 2016/0264798 A1 | 9/2016 | Allen et al. |
| 2016/0333205 A1 | 11/2016 | Lee et al. |

FOREIGN PATENT DOCUMENTS

| | | |
|---|---|---|
| JP | 2011208019 A | 10/2011 |
| WO | 2013119539 A1 | 8/2013 |

OTHER PUBLICATIONS

Communication dated May 4, 2015, issued in EP Appl. No. 14196839.6, pp. 1-5.

Leach, et al., "The Printing Ink Manual, 5th Edition", Blue Print, New York, pp. 84-86, 516, 525, 544-550, 724-726 (1993).

Henri Bouas-Laurent, et al., Organic Photochromism (IUPAC Technical Report), Pure Appl. Chem., vol. 73, No. 4, pp. 639-665, 2001.

Breton, et al., "White Ink Composition for Ink-Based Digital Printing", U.S. Appl. No. 14/028,369, filed Sep. 16, 2013.

Breton, et al., "Water-Dilutable Inks and Water-Diluted Radiation Curable Inks Useful for Ink-Based Digital Printing", U.S. Appl. No. 13/897,300, filed May 17, 2013.

Allen, et al., "Acrylate Ink Compositions for Ink-Based Digital Lithographic Printing", U.S. Appl. No. 14/645,153, filed Mar. 11, 2015.

Lee, et al., "Methods for Manufacturing Curable Inks for Digital Offset Printing Applications and the Inks Made Therefrom", U.S. Appl. No. 13/947,959, filed Jul. 22, 2013.

Iftime et al., "Fluorescent Security Enabled Ink for Digital Offset Printing Applications", U.S. Appl. No. 13/473,791, filed May 17, 2012.

Iftime, et al., "Photochromic Security Enabled Ink for Digital Offset Printing Applications", U.S. Appl. No. 13/473,921, filed May 17, 2012.

(56) References Cited

OTHER PUBLICATIONS

Moorlag, et al., "Methods for Ink-Based Digital Printing With High Ink Transfer Efficiency", U.S. Appl. No. 14/139,690, filed Dec. 23, 2013.

Breton, et al., "Aqueous Dispersible Polymer Inks", U.S. Appl. No. 14/139,708, filed Dec. 23, 2013.

Moorlag, et al., "Inverse Emulsion Acrylate Ink Compositions for Ink-Based Digital Lithographic Printing", U.S. Appl. No. 14/501,071, filed Sep. 30, 2013.

Lee, et al., "Methods for Manufacturing Curable Inks for Digital Offset Printing Applications and the Inks Made Therefrom", U.S. Appl. No. 13/474,185, filed May 17, 2012.

Allen, et al., "Acrylate Ink Compositions for Ink-Based Digital Lithographic Printing", U.S. Appl. No. 14/610,437, filed Jan. 30, 2015.

Breton, et al., "Process Black Ink Compositions and Uses Thereof", U.S. Appl. No. 14/635,679, filed Mar. 2, 2015.

Moorlag, et al., "Hyperbranched Ink Compositions for Controlled Dimensional Change and Low Energy Curing", U.S. Appl. No. 14/620,945, filed Feb. 12, 2015.

Allen, et al., "Acrylate Ink Compositions for Ink-Based Digital Lithographic Printing", U.S. Appl. No. 14/573,913, filed Dec. 17, 2014.

Stowe, et al., "Methods for Rejuvenating an Imaging Member of an Ink-Based Digital Printing System", U.S. Appl. No. 15/240,691, filed Aug. 18, 2016.

Badesha, et al. "Fluorosilicone Composite and Formulation Process for Imaging Plate", U.S. Appl. No. 15/222,364, filed Jul. 28, 2016.

Birau, et al. "Ink Composition and Method of Printing", U.S. Appl. No. 15/377,881, filed Dec. 13, 2016.

Allen, et al., "Acrylate Ink Compositions for Ink-Based Digital Lithographic Printing", U.S. Appl. No. 15/435,098, filed Feb. 16, 2017.

Breton, et al. "Aqueous Dispersible Polymer Inks", U.S. Appl. No. 15/442,260, filed Feb. 24, 2017.

Wikipedia, "Polyester," https://en.wikipedia.org.wiki/Polyester, 9 pages.

Author unknown, "Combining Polyester and Acrylate," European Coatings Journal, Sep. 2004, p. 26, Vincentz Network.

Wikidiff, "Polyacrylate vs. Polyester—What's the Difference?", downloaded Oct. 4, 2018, https://wikidiff.com/polyester/polyacrylate, 2 pages.

\* cited by examiner

WHITE INK COMPOSITION FOR INK-BASED DIGITAL PRINTING

FIELD OF DISCLOSURE

The present disclosure relates to digital offset printing. In particular, this disclosure relates to white inks suitable for digital offset printing, among other printing applications.

BACKGROUND

Typical lithographic and offset printing techniques utilize plates that are permanently patterned, and are, therefore, useful only when printing a large number of copies of the same image, such as magazines, newspapers, and the like. Variable data digital lithography or digital offset lithographic printing has been developed as a system that uses a non-patterned re-imageable surface, which is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned re-imageable surface. Ink applied thereover is retained in the pockets formed by the removal of the dampening fluid. The inked surface is then brought into contact with a substrate, such as paper, plastic or metal and the ink transfers from the pockets in the dampening fluid layer to the substrate. The dampening fluid may then be removed, a new uniform layer of dampening fluid applied to the re-imageable surface, and the process repeated.

Digital offset printing systems use offset-type inks that are specifically designed and optimized to be compatible with the materials the ink is in contact with, including the re-imageable surface and the dampening solution as well as with the various subsystems used during the printing process to enable high quality digital printing at high speed.

For example, an inker subsystem may be used to apply a uniform layer of ink over the layer of dampening fluid. The inker subsystem may use an anilox roller to meter the ink onto one or more ink forming rollers that are in contact with the re-imageable surface. The ink used with this subsystem should have a viscosity that is not so high that anilox-take up and delivery to the re-imageable surface is difficult. However, too low of a viscosity, tack and/or poor cohesion may result in the ink crawling out of the ink loader, resulting in unwanted spills, loss of ink and potential contamination of the printer. Accordingly, digital offset inks should have a certain range of viscosity, tack and tack stability to afford sufficient and predictable ink cohesion to enable good transfer properties in and among the various subsystems.

Although there is a growing demand to expect digital offset printing to produce white for background labels, tinting purposes or special effects on metallic substrates, for example, many white inks known in the art do not have the necessary transfer properties. Previous formulated white inks containing titanium dioxide ($TiO_2$) pigment, for example, have relatively low tack and poor ink cohesion or higher tack but poorer tack stability over time.

Further, the hiding power (the ability to effectively mask an underlying color) of a white ink image on a substrate is associated with brightness and reflection properties, which are extremely sensitive to the amount of white ink that is transferred. Reduced tack and/or reduced tack stability may thus lead to insufficient coverage of substrates printed using digital offset printing architecture.

Accordingly, there is a desire in the art for white inks that meet all of the functional requirements of the sub-systems for digital offset printing while retaining sufficient ink tack stability to provide adequate coverage of white ink on a printed substrate.

SUMMARY

The present disclosure is directed to a white ink composition for use in digital offset printing, including a first white colorant including a first plurality of white pigment particles, wherein an average diameter of at least about 40% of the first plurality of white pigment particles is in a range of about 250 nanometers to about 350 nanometers, a second white colorant including a second plurality of white pigment particles, wherein an average diameter of at least about 40% of the second plurality of white pigment particles is in a range of about 350 nanometers to about 550 nanometers, at least one dispersant, at least one component selected from a curable monomer or a curable oligomer, and a photo-initiator.

Also provided herein is a method of digital offset printing, which method includes: applying a white ink composition onto a re-imageable imaging member surface, the re-imageable imaging member having dampening fluid disposed thereon; forming an ink image; transferring the ink image from the re-imageable surface of the imaging member to a printable substrate; wherein the white ink composition includes a first white colorant including a first plurality of white pigment particles, wherein an average diameter of at least about 40% of the first plurality of white pigment particles is in a range of about 250 nanometers to about 350 nanometers, a second white colorant including a second plurality of white pigment particles, wherein an average diameter of at least about 40% of the second plurality of white pigment particles is in a range of about 350 nanometers to about 550 nanometers, at least one dispersant, at least one component selected from a curable monomer or a curable oligomer, and a photo-initiator.

DETAILED DESCRIPTION

Figure 1:
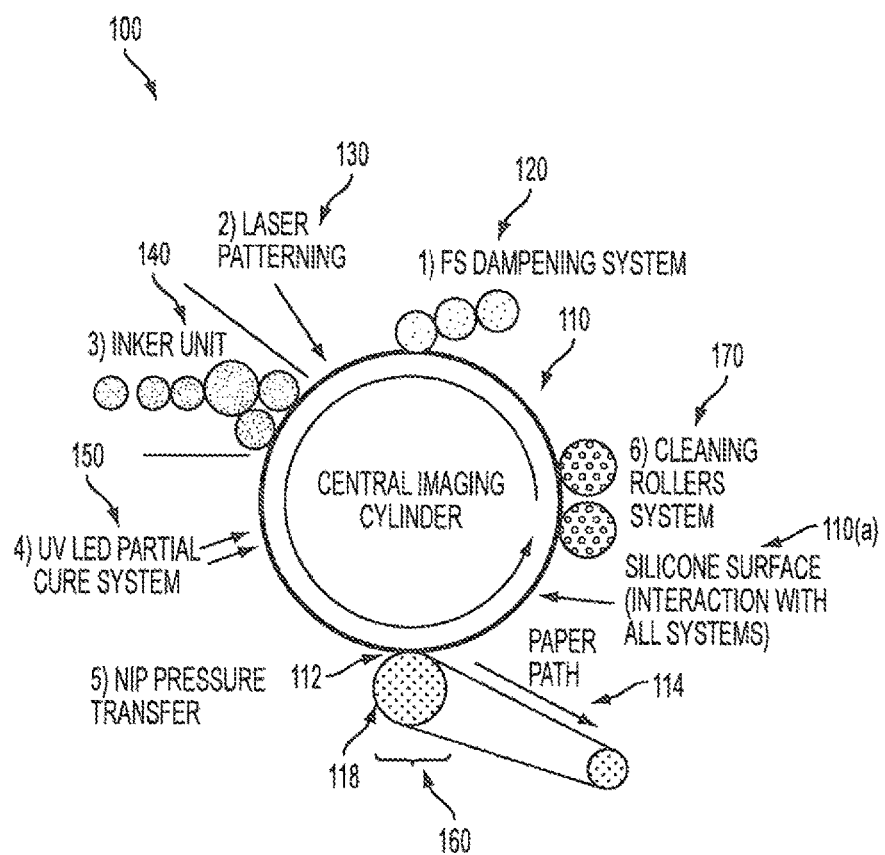
FIG. 1 illustrates a schematic representation of a related art ink-based variable image digital printing system with which the white ink compositions according to this disclosure may be used.

Exemplary embodiments are described in detail below in formulation and in use. It is envisioned, however, that any system that incorporates features of the systems and compositions, as set forth below may be encompassed by the scope and spirit of the exemplary embodiments.

Exemplary embodiments are intended to cover alternatives, modifications and equivalents as may be included within the spirit and scope of the compositions and systems described in detail below.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Reference is made to the drawings to accommodate understanding of the white inks compositions, methods, and systems of embodiments.

The present disclosure relates to white ink compositions that are suitable for use in digital offset printing processes as described herein. The present white ink composition includes a first white colorant and a second white colorant, a dispersant, at least one curable monomer and/or curable oligomer, at least one photo-initiator, optionally at least one free radical scavenger and optionally at least one filler.

The first and second white colorants include any desired or effective white colorant including pigments, mixtures of pigments, mixtures of pigments and dyes and the like, provided that the colorant may be dissolved or dispersed in at least one curable monomer or at least one curable oligomer and at least one dispersant. In specific embodiments, the colorant is a pigment.

In some embodiments, the first white colorant of the present white ink composition comprises a first plurality of white pigment particles and the second white colorant includes a second plurality of white pigment particles. The phrase "white pigment particles" refers to particles of substances that when incorporated into an ink, impart a white color to a feature printed using the white ink containing the white pigment particles. The term excludes the presence of any colored pigment including colored pigment particles. Examples of suitable white pigment particles include pigment particles of titanium dioxide, zinc oxide, barium carbonate, silicon dioxide, zinc sulfide, barium sulfate, calcium sulfate, calcium carbonate, antimony trioxide, aluminum hydroxide, kaolin, and mixtures of two or more of the above.

In some embodiments, the first white colorant and the second white colorant comprise the same type of white pigment particles. For example, the first white colorant and the second white colorant may comprise a first plurality and a second plurality, respectively, of titanium dioxide pigment particles.

In various embodiments, the first white colorant includes a first plurality of white pigment particles of various sizes. In some embodiments, at least about 40%, such as at least about 75%, such as at least about 90% of the first plurality of white pigment particles have an average diameter particle size. In some embodiments, the average diameter particle size of the first plurality of white pigment particles is in a range from about 250 nanometers (nm) to about 350 nm, such as from about 300 nm to about 350 nm, more typically about 300 nm.

In various embodiments, the second white colorant includes a second plurality of white pigment particles of various sizes. In some embodiments, at least about 40%, such as at least about 75%, such as at least about 90% of the second plurality of white pigment particles have an average diameter particle size. In some embodiments, the average diameter particle size of the second plurality of white pigment particles is in a range from about 450 nm to about 550 nm, such as from about 500 nm to about 550 nm, more typically about 500 nm.

As noted above, in some embodiments, the white pigment particles of the first plurality and the white pigment particles of the second plurality comprise the same type of white pigment particles, albeit with different average diameter particle sizes. For example, a first plurality of white pigment particles comprising titanium dioxide may be used, such as Ti-Pure® R-703 having an average diameter particle size of about 300 nm while the second plurality of white pigment particles may also comprise titanium dioxide, but with a different average diameter particle size, such as Ti-Pure® R-931 having an average diameter particle size of about 500 nm. Ti-Pure® R-703 and Ti-Pure® R-931 are available from DuPont Titanium Technologies, Wilmington, Del. In some embodiments, the white pigment particle sizes may be assessed by transmission electron microscopy.

In some embodiments, the first and second plurality of white pigment particles having a first and second average diameter particle size, respectively, may be present in the white ink composition of the instant disclosure in any desired or effective amount. For example, the first plurality of white pigment particles having a first average diameter particle size may be present in the white ink composition of the instant disclosure in an amount (by weight) of at least about 2%, such as at least about 5%, such as at least about 8%, such as at least about 10%, more typically at least about 7%; and the second plurality of white pigment particles having a second average diameter particle size may be present in the white ink composition of the present disclosure in an amount (by weight) of at least about 20%, at least about 25%, or more typically at least about 30%.

In some embodiments, the white colorant is dispersed in a suitable dispersant. In embodiments, suitable dispersants include copolymers and block copolymers containing pigment affinic groups, such as amines, esters, alcohols and carboxylic acids and salts thereof. Illustrative examples of suitable dispersants include dispersants selected from Efka® 4008, Efka® 4009, Efka® 4047, Efka® 4520, Efka® 4010, Efka® 4015, Efka® 4020, Efka® 4050, Efka® 4055, Efka® 4080, Efka® 4300, Efka® 4330, Efka® 4400, Efka® 4401, Efka® 4403, Efka® 4406, Efka® 4800, all available from BASF, Charlotte, N.C., Disperbyk® 101, Disperbyk® 102, Disperbyk® 107, Disperbyk® 108, Disperbyk® 109, Disperbyk® 110, Disperbyk® 111, Disperbyk® 112, Disperbyk® 115, Disperbyk® 162, Disperbyk® 163, Disperbyk® 164, Disperbyk® 2001, all available from BYK Additives & Instruments, Wesel Germany, Solsperse® 24000 SC/GR, Solsperse® 26000, Solsperse® 32000, Solsperse® 36000, Solsperse® 39000, Solsperse® 41000, Solsperse® 71000 all available from Lubrizol Advanced Materials, Inc. Cleveland, Ohio or mixtures or combinations thereof.

In specific embodiments, the dispersant includes XD A-504 from King Industries, Norfolk, Conn. The dispersant may be present in the white ink composition of the instant disclosure in an amount of about 0% to about 20% by weight, such as about 1% to about 10% by weight, such as about 6% to about 10% by weight, based upon the total weight of the white ink composition.

In some embodiments, the white ink composition of the present disclosure includes further components such as a suitable curable monomer. Examples of suitable materials include radically curable monomer compounds, such as acrylate and methacrylate monomer compounds. Specific examples of acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate and the like, as well as mixtures or combinations thereof.

In specific embodiments, propoxylated trimethylolpropane triacrylate such as SR501 from Sartomer Co. is used. The monomers may be present in the white ink composition of the present disclosure in an amount from about 0% to about 50% by weight, such as about 1% to about 30% by weight, such as about 5% to about 30% by weight, such as about 5% to about 10% by weight, based upon the total weight of the present white ink composition.

In some embodiments, the white ink composition of the present disclosure includes a curable oligomer. Suitable curable oligomers include, but are not limited to acrylated polyesters, acrylated polyethers, acrylated epoxies, urethane acrylates, and pentaerythritol tetraacrylate. Specific examples of suitable acrylated oligomers include, but are not limited to, acrylated polyester oligomers, such as CN2255®, CN2256®, CN294E®, CN2282® (Sartomer Co.), and the like, acrylated urethane oligomers, acrylated epoxy oligomers, such as CN2204®, CN110® (Sartomer Co.) and the like; and mixtures and combinations thereof. The oligomers may be present in the white ink composition in an amount of about 0% to about 50% by weight, such as about 1% to about 30% by weight, such as about 5% to about 30% by weight, based upon the total weight of the present white ink composition.

In some embodiments, the present white ink composition includes a photo-initiator, such as a α-hydroxyketone photo-initiator (including α-hydroxyketone photoinitiators sold under the trade name IRGACURE® 184, IRGACURE® 500, DAROCUR® 1173, and IRGACURE® 2959, which are manufactured by BASF), α-aminoketone photo-initiators (including α-aminoketone photo-initiators IRGACURE® 369, IRGACURE® 379, IRGACURE® 907, and IRGACURE® 1300, which are manufactured by BASF) and bisacyl phosphine photo-initiators (including bisacyl phospine photo-initiators sold under the trade name IRGACURE® 819, IRGACURE® 819DW, and IRGACURE® 2022, which are manufactured by BASF). Other suitable photo-initiators include monoacylphosphine oxide and bisacylphosphine oxide, such as 2,4,6-trimethylbenzoybiphenyl-phosphine oxide (manufactured by BASF under the trade name LUCIRIN® TPO); ethyl-2,4,6-trimethylbenzoylphenyl phosphinate (manufactured by BASF under the trade name LUCIRIN® TPO-L); mono- and bis-acylphosphine photoinitiators (such IRGACURE® 1700, IRGACURE® 1800, IRGACURE® 1850, and DAROCUR® 4265, manufactured by BASF), benzyldimethyl-ketal photo-initiators (such as IRGACURE® 651, manufactured by BASF) and oligo[2-hydroxy-2-methyl-1-[4-(1-methylvinyl)phenyl]propanone](available as Esacure® KIP 150 from Lamberti); and the like, as well as mixtures thereof.

The photo-initiator or mixture of photo-initiators may be present in the white ink composition of the instant disclosure in an amount of about 0% to about 12% by weight, such as about 1% to about 10%, by weight such as about 2% to about 8% by weight, based upon the total weight of the white ink composition.

In some embodiments, the white ink composition of the present disclosure comprises a free radical scavenger, such as IRGASTAB® UV10, IRGASTAB® UV22 available from BASF or CN3216 available from Sartomer Co. The free radical scavenger may be present in the white ink composition in an amount of about 0% to about 5% by weight, such as from about 0.5% to about 4% by weight, such as about 2% to about 3% by weight, based upon the total weight of the present white ink composition.

In some embodiments, the white ink composition of the present disclosure includes fillers. Suitable fillers may include, but are not limited to, amorphous, diatomaceous, fumed quartz and crystalline silica, clays, aluminum silicates, magnesium aluminum silicates, talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like. In specific embodiments, the filler may be clays from Southern Clay Products CLAYTONE® HA and CLAYTONE® HY. In some embodiments, filler may be present in the white ink composition of the present disclosure in an amount from about 0% to about 50% by weight, such as about 1% to about 20% by weight, such as from about 2% to about 10% by weight, based upon the total weight of the present white ink composition.

In some embodiments, the present white ink composition has a greater tack property and greater tack stability than conventional white inks. As is understood in the art, "tack" is a function of the force required to split a thin fluid film of a printing ink or vehicle between two rapidly separating surfaces and is a rheological parameter indicative of internal cohesion of a fluid.

The tack of the white ink composition of the present disclosure may be assessed using an inkometer, where a small sample of ink is placed on counter-rotating rollers, and the amount of attraction, or "tack", between the two rollers is measured over a period of several seconds to several minutes. The resulting graph of force versus time, called a "tack curve", is used to predict the stability of the ink during printing.

In some embodiments, the tack of the present white ink composition ranges from about 26 gram-meters to about 35 gram-meters, such as from about 26 gram-meters to about 33 gram-meters, more typically from about 27 gram-meters to about 31 gram-meters after 60 seconds at about 1200 rpm at about 32° C. on an inkometer, e.g., an Inkometer 1100, made by the Thwing-Albert Company, Philadelphia, Pa.

In some embodiments, the tack of the present white ink compositions is highly stable. For example, in some embodiments, the difference in tack value at 600 seconds in comparison to the tack value at 60 seconds is increased by less than about 10 gram-meters, such as less than about 5 gram-meters, such as less than about 3 gram-meters when assessed, for example, at about 1200 rpm at about 32° C. on an inkometer, e.g., an Inkometer 1100, made by the Thwing-Albert Company, Philadelphia, Pa. More typically, the difference in tack values of the present white ink compositions at 600 seconds in comparison to the tack values at 60 seconds is decreased by less than about 6 gram-meters, such as less than about 5 gram-meters, such as less than about 3 gram-meters, when assessed, for example, at about 1200 rpm at about 32° C. on an inkometer, e.g., an Inkometer 1100, made by the Thwing-Albert Company, Philadelphia, Pa. For example, the difference in tack values between 60 seconds and 600 seconds may be increased or decreased by about 25%, about 20% or about 10%.

In some embodiments, the difference in tack values of the present white ink compositions at 600 seconds in comparison to the tack values at 120 seconds is increased by less than about 5.0 gram-meters, such as less than about 3 gram-meters, such as less than about 0.5 gram-meters, when assessed, for example, at about 1200 rpm at about 32° C. on an inkometer, e.g., an Inkometer 1100, made by the Thwing-Albert Company, Philadelphia, Pa. In other embodiments, the difference in tack values at 600 seconds in comparison to the tack values at 120 seconds is decreased by less than about 5.0 gram-meters, such as less than about 3 gram-meters, such as less than about 0.5 gram-meters when assessed, for example, at about 1200 rpm at about 32° C. on an inkometer, e.g., an Inkometer 1100, made by the Thwing- Albert Company, Philadelphia, Pa. For example, the difference in tack values between 120 seconds and 600 seconds may be increased or decreased by about 25%, about 20% or about 10%.

In some embodiments, the viscosity of the present white ink composition drops at higher rates of shear velocity similar to conventional white ink compositions as demonstrated in the Examples, below. In some embodiments, the white ink composition of the present disclosure may have a viscosity similar to conventional inks for digital offset printing applications, for example, from about 500,000 centipoise to about 3,000,000 centipoise at 35° C. at a shear rate of 0.1 sec$^{-1}$. Alternatively, the white ink composition may have a shear thinning index (viscosity at 40 sec$^{-1}$/viscosity at 10 sec$^{-1}$) at 35° C. of from about 0.10 to about 0.60, more typically about 0.60.

The present disclosure further provides a method of digital offset printing, which includes applying the white ink composition of the present disclosure onto a re-imageable imaging member surface, the re-imageable imaging member having dampening fluid disposed thereon; forming an ink image; and transferring the ink image from the re-imageable surface of the imaging member to a printable substrate.

An exemplary digital offset printing architecture is shown in FIG. 1. As seen in FIG. 1, an exemplary system 100 may include an imaging member 110. The imaging member 110 in the embodiment shown in FIG. 1 is a drum, but this exemplary depiction should not be interpreted so as to exclude embodiments wherein the imaging member 110 includes a plate or a belt, or another now known or later developed configuration. The re-imageable surface 110(a) may be formed of materials including, for example, a class of materials commonly referred to as silicones, including flurosillcone, among others. The re-imageable surface may be formed of a relatively thin layer over a mounting layer, a thickness of the relatively thin layer being selected to balance printing or marking performance, durability and manufacturability.

U.S. patent application Ser. No. 13/095,714 ("714 application"), titled "Variable Data Lithography System," filed on Apr. 27, 2011, by Timothy Stowe et al., which is commonly assigned, and the disclosure of which is hereby incorporated by reference herein in its entirety, depicts details of the imaging member 110 including the imaging member 110 being comprised of a re-imageable surface layer 110(a) formed over a structural mounting layer that may be, for example, a cylindrical core, or one or more structural layers over a cylindrical core.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 includes, but is not limited to, any particular composition or form such as, for example, paper, plastic, folded paperboard, Kraft paper, clear substrates, metallic substrates or labels. The exemplary system 100 may be used for producing images on a wide variety of image receiving media substrates. The 714 application also explains the wide latitude of marking (printing) materials that may be used.

The exemplary system 100 includes a dampening fluid system 120 generally comprising a series of rollers, which may be considered as dampening rollers or a dampening unit, for uniformly wetting the re-imageable surface of the imaging member 110 with dampening fluid. A purpose of the dampening fluid system 120 is to deliver a layer of dampening fluid, generally having a uniform and controlled thickness, to the re-imageable surface of the imaging member 110. It is known that a dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoropropoxy)pentane.), and D4 (octamethylcyclotetrasiloxane). Other suitable dampening fluids are disclosed, by way of example, in co-pending U.S. patent application Ser. No. 13/284,114, filed on Oct. 28, 2011, titled "Dampening Fluid For Digital Lithographic Printing," the disclosure of which is hereby incorporated herein by reference in its entirety.

Once the dampening fluid is metered onto the re-imageable surface of the imaging member 110, a thickness of the dampening fluid may be measured using a sensor (not shown) that may provide feedback to control the metering of the dampening fluid onto the re-imageable surface of the imaging member 110 by the dampening fluid system 120.

After a precise and uniform amount of dampening fluid is provided by the dampening fluid system 120 on the re-imageable surface of the imaging member 110, an optical patterning subsystem 130 may be used to selectively form a latent image in the uniform dampening fluid layer by imagewise patterning the dampening fluid layer using, for example, laser energy. Typically, the dampening fluid will not absorb the optical energy (IR or visible) efficiently. The re-imageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the re-imageable surface of the imaging member 110 is presented to an inker subsystem 140. The inker subsystem 140 is used to apply a uniform layer of ink over the layer of dampening fluid and the re-imageable surface layer of the imaging member 110. The inker subsystem 140 may use an anilox roller to meter an offset lithographic ink, such as the white ink compositions of the present disclosure, onto one or more ink forming rollers that are in contact with the re-imageable surface layer of the imaging member 110. Separately, the inker subsystem 140 may include other traditional elements such as a series of metering rollers to provide a precise feed rate of ink to the reimageable surface. The inker subsystem 140 may deposit the ink to the pockets representing the imaged portions of the re-imageable surface, while ink on the unformatted portions of the dampening fluid will not adhere to those portions.

The cohesiveness and viscosity of the ink residing in the re-imageable layer of the imaging member 110 may be modified by a number of mechanisms. One such mechanism may involve the use of a rheology (complex viscoelastic modulus) control subsystem 150. The rheology control system 150 may form a partial crosslinking layer of the ink on the re-imageable surface to, for example, increase ink cohesive strength relative to the re-imageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the re-imageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the re-imageable surface of the imaging member 110 is brought into physical contact with the substrate 114. With the adhesion of the ink, such as the white ink of the present disclosure, having been modified by the rheology control system 150, modified adhesion of the ink causes the ink to adhere to the substrate 114 and to separate from the re-imageable surface of the imaging member 110. Careful control of the temperature and pressure conditions at the transfer nip 112 may allow transfer efficiencies for the ink, such as the white ink of the present disclosure, from the re-Imageable surface of the imaging member 110 to the substrate 114 to exceed 95%. While it is possible that some dampening fluid may also wet substrate 114, the volume of such a dampening fluid may be minimal, and may rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method.

Following the transfer of the majority of the ink to the substrate 114, any residual ink and/or residual dampening fluid may be removed from the re-imageable surface of the imaging member 110, typically without scraping or wearing that surface. An air knife may be employed to remove residual dampening fluid. It is anticipated, however, that some amount of ink residue may remain. Removal of such remaining ink residue may be accomplished through use of some form of cleaning subsystem 170. The 714 Application describes details of such a cleaning subsystem 170 including at least a first cleaning member such as a sticky or tacky member in physical contact with the re-imageable surface of the imaging member 110, the sticky or tacky member removing residual ink and any remaining small amounts of surfactant compounds from the dampening fluid of the re-imageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 application details other mechanisms by which cleaning of the re-imageable surface of the imaging member 110 may be facilitated. Regardless of the cleaning mechanism, however, cleaning of the residual ink and dampening fluid from the re-imageable surface of the imaging member 110 may be used to prevent ghosting in the system. Once cleaned, the re-imageable surface of the imaging member 110 is again presented to the dampening fluid system 120 by which a fresh layer of dampening fluid is supplied to the re-imageable surface of the imaging member 110, and the process is repeated.

The white ink composition in accordance with the present disclosure is not limited to use in digital offset printing. The white ink composition disclosed herein may also be useful in conventional offset printing or hybrid conventional offset and digital offset printing systems. Nonetheless, the white ink compositions of the present disclosure meet systems requirements that are unique to digital offset printing systems. In particular, the present white ink compositions satisfy wetting and release requirements imposed by the re-imageable imaging member of ink-based digital printing systems. Further, the white ink compositions of the present disclosure are compatible with dampening fluids suitable for ink-based digital printing, including non-aqueous dampening fluids. The white ink compositions of the present disclosure are also enabled for transfer from an ink delivery system such as anilox roll to the imaging member, e.g., re-imageable offset plate.

EXAMPLES

Example 1

White inks suitable for digital offset printing were prepared by weighing the components of the ink listed in Table 1, below, into a 125 milliliter low density polyethylene (LDPE) bottle. The samples were then processed by acoustic mixing using a RAM Resodyn™ mixer at 90% intensity, 60 Hz frequency at about 100 G force for about 15 minutes. The processed samples were discharged into a metal beaker and stirred with heating using an anchor impeller for about 60 minutes at 80° C. The inks were finally passed three times through an Erweka 3-roll mill and then discharged into glass amber bottles.

TABLE 1

| Ink Formulation | | | Comparative Example | | Example | |
| --- | --- | --- | --- | --- | --- | --- |
| Component | | Available from | 1 | 2 | 3 | 4 |
| Pigment | TiO$_2$ R-708 | Dupont | 0 | 37 | 7 | 7 |
| | TiO$_2$ R-931 | Dupont | 37 | 0 | 30 | 30 |
| Dispersant | XD A-504 | King Industries | 6.25 | 6.25 | 6.25 | 6.25 |
| Oligomer | Sartomer CN294E | Sartomer Company | 30.73 | 30.73 | 30.73 | 32.73 |
| | Sartomer CN2256 | Sartomer Company | 5.65 | 5.65 | 5.65 | 5.65 |
| Monomers | SR501 | Sartomer Company | 10.36 | 10.36 | 10.36 | 8.36 |
| Photo-initiator | Irgacure 379 | BASF | 2 | 2 | 2 | 2 |
| | Irgacure 819 | BASF | 0.39 | 0.39 | 0.39 | 0.39 |
| | Irgacure 184 | BASF | 1 | 1 | 1 | 1 |

TABLE 1-continued

| Ink Formulation | | | Comparative | | | |
|---|---|---|---|---|---|---|
| | | Available | Example | | Example | |
| Component | | from | 1 | 2 | 3 | 4 |
| | Esacure KIP 150 | Lamberti Technologies | 3.62 | 3.62 | 3.62 | 3.62 |
| free radical scavenger | CN3216 | Sartomer Company | 1 | 1 | 1 | 1 |
| Filler | Claytone HY | Southern Clay Products | 2 | 2 | 2 | 2 |
| | Total wt % | | 100 | 100 | 100 | 100 |

Example 2

Each of the white inks prepared as described above were tested on an inkometer 1100, available from Thwing-Albert Company, Philadelphia, Pa. The UV ink-rated rollers on the inkometer were equilibrated at 32.2° C. In each case, 1.3 milliliters of ink was applied to the distribution roll where transfer and distribution on the other rollers was allowed to continue for 15 seconds at 150 RMP, upon which time the speed of the rollers was automatically increased to 1200 rpm. Tack measurements of the inks occurred every 20 seconds for 10 minutes. Exemplary tack data metrics are present below in Table 2.

TABLE 2

| | Comparative Example | | Example | |
|---|---|---|---|---|
| Metric | 1 | 2 | 3 | 4 |
| Minimum Tack[1] | 16.5 | 25.2 | 26.2 | 29 |
| Maximum Tack[2] | 19.1 | 30.4 | 31.2 | 31.8 |
| Average Tack[3] | 17.3 | 26.5 | 26.8 | 29.8 |
| 60 s Tack[4] | 19.1 | 29.2 | 27.6 | 31.2 |
| % differential tack from 60 s[5] | −13.6 | −12.7 | −3.6 | −6.4 |
| % differential tack from 120 s[6] | −9.3 | −6.9 | −0.4 | −3.6 |

[1]The lowest tack result in the test
[2]The highest tack result in the test
[3]The mean of 30 tack readings taken at 20 second intervals.
[4]The tack value at 60 seconds
[5]The relative difference in tack at 600 seconds to the tack at 60 seconds
[6]The relative difference in tack at 600 seconds to the tack at 120 seconds The comparative example, white inks 1 and 2, formulated with single component $TiO_2$ grades having relatively larger and small particles, respectively, resulted in varying degrees of tack, but both inks had relatively poor tack stability. The Example 3 and 4 white ink compositions of the present disclosure displayed first, surprisingly higher than expected tack, giving that the formulation of both white inks were formulated substantially more with the $TiO_2$ grade that had larger particles, and second, the stability of tack over time as demonstrated from the data was much higher than the stability of the comparative example inks.

Figure 2:
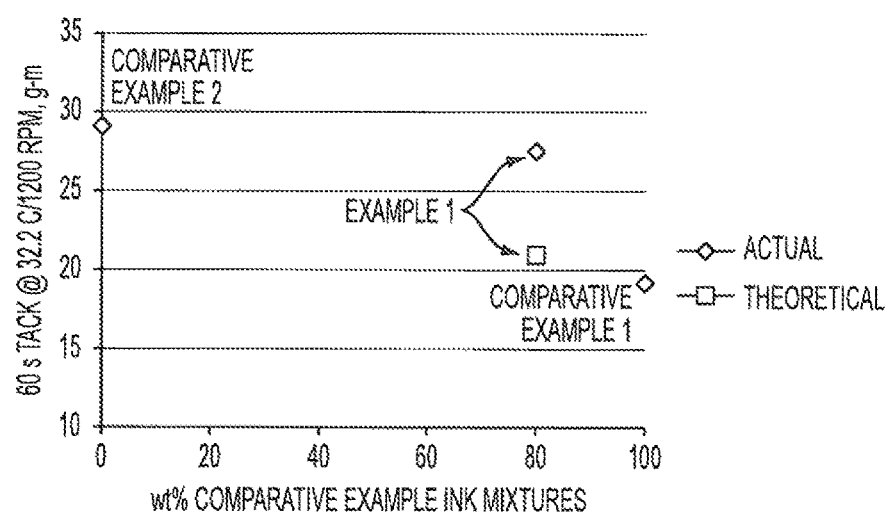
FIG. 2 illustrates theoretical and actual tack values at 60 seconds for inks including mixed $TiO_2$ pigments as described in the Examples.

The measured versus theoretical tack values at 60 seconds for the Comparative Example inks, 1 and 2, and the Example 3 ink, are summarized in FIG. 2. As seen in FIG. 2, the measured tack value of Example 3 ink white ink prepared according to the present disclosure has unexpectedly and substantially higher tack than the theoretical tack value calculated based upon the weight ratio of the $TiO_2$ grades of that ink.

A white ink having a high tack stability (low tack differential over time) will allow such white ink to have predictable tack and accordingly predictable ink cohesion and transfer characteristics, resulting in predictable opacity and hiding power of various substrates. Such predictability is desirable during delivery into a digital off set printing press architecture, which may vary by, for example, by having different ink residence times due to differences in geometry and speeds.

Figure 3:
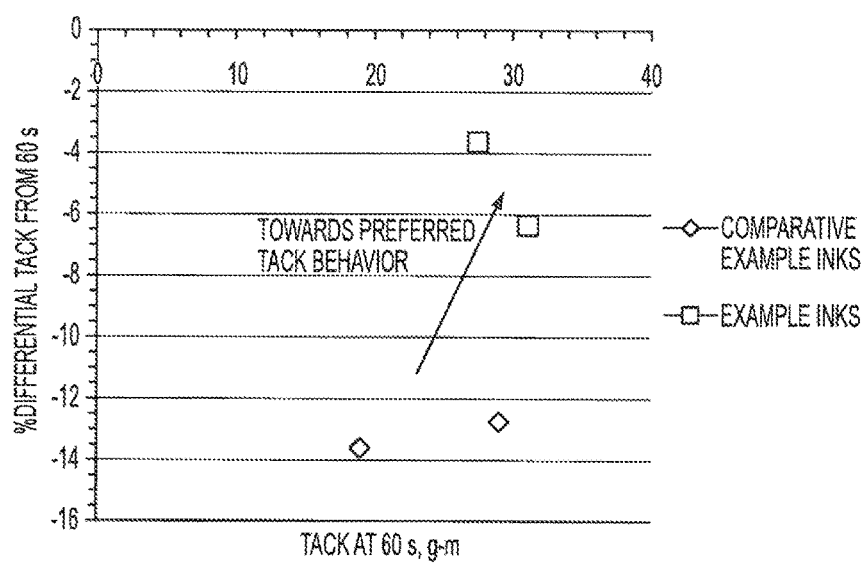
FIG. 3 illustrates the tack and tack stability values of $TiO_2$ inks as described in the Examples.

FIG. 3 depicts the tack values at 60 seconds as well as the % differential of tack from 60 seconds. The results shown in FIG. 3 demonstrate the unexpected, but desired result of not only increased tack, but an increase in tack stability when inks are prepared by mixing $TiO_2$ pigments having different average pigment particles sizes according to the present disclosure.

Example 3

Rheology of the white inks prepared as described above were tested on an RFS-3 rheometer (Rheometrics Scientific, now part of TA Instruments, New Castle, Del.) at 35° C. using a frequency sweep protocol such that the frequency ranged from 0.1 to 100 radians per second (rad/s). Selected viscosity metrics including the viscosities at very low frequency (0.1 rad/s), intermediate frequencies (1 to 10 rad/s) and the highest frequency the instrument was capable of measuring (100 rad/s) are shown in Table 3, below. The ratios of viscosities at various frequencies are also summarized in Table 3.

TABLE 3

| Metric | Comparative Example 1 ink | Example 3 ink | Example 4 ink |
|---|---|---|---|
| Viscosity(0.1 rad/s), mPa·s | 2.52E+06 | 2.42E+06 | 2.01E+06 |
| Viscosity(0.4 rad/s), mPa·s | 8.90E+05 | 8.57E+05 | 7.35E+05 |
| Viscosity(1.0 rad/s), mPa·s | 4.56E+05 | 4.61E+05 | 3.86E+05 |
| Viscosity(4.0 rad/s), mPa·s | 1.99E+05 | 2.18E+05 | 1.78E+05 |
| Viscosity(10.0 rad/s), mPa·s | 1.26E+05 | 1.44E+05 | 1.17E+05 |
| Viscosity(40.0 rad/s), mPa·s | 6.89E+04 | 8.25E+04 | 6.61E+04 |
| Viscosity(100.0 rad/s), mPa·s | 4.67E+04 | 5.72E+04 | 4.55E+04 |
| Shear Thinning index (0.4/0.1) | 0.35 | 0.35 | 0.37 |
| Shear Thinning Index (4/1) | 0.44 | 0.47 | 0.46 |
| Shear Thinning Index (40/10) | 0.55 | 0.57 | 0.57 |

The rheology results in Table 3 indicate that the Example white inks 3 and 4, comprising the same mixed $TiO_2$ pigments and ratio, and despite the subtle shift in formulation of CN294E, do not drive the preferred tack behavior seen in the results of Table 2. Rather, it is an unexpected behavior and benefit arriving from the unpredictable interaction of the different grades of $TiO_2$ pigment, having different particle size distributions centered about statistically different means sizes.

It will be appreciated that the above-disclosed and other features and functions, or alternatives thereof, may be desirably combined into many other different compositions or formulations, systems or applications. Also, various presently unforeseen or unanticipated alternatives, modifications, variations or improvements therein may be subsequently made by those of skill in the printing and ink arts.

What is claimed is:

1. A white ink composition for use in digital offset printing, comprising:
a first white colorant comprising a first plurality of white pigment particles, wherein an average diameter of at least about 40% of the first plurality of white pigment particles is in a range of about 250 nanometers to about 350 nanometers, a second white colorant comprising a second plurality of white pigment particles, wherein an average diameter of at least about 40% of the second plurality of white pigment particles is in a range of about 500 nanometers to about 550 nanometers, wherein the first white colorant comprising white pigment particles is present in an amount of at least about 2 weight percent to about 7 weight percent and the second white colorant comprising white pigment particles is present in an amount of at least about 20 weight percent to about 30 weight percent, at least one dispersant, a photo initiator, at least one curable oligomer compound selected from the group consisting of acrylated polyesters, acrylated polyethers, acrylated epoxies and urethane acrylates, and at least one curable monomer compound selected from the group consisting of isobornyl acrylate, isobornyl methacrylate, lauryl acrylate, lauryl methacrylate, isodecylacrylate, isodecylmethacrylate, 2-phenoxyethyl acrylate, isooctylacrylate, isooctylmethacrylate, butyl acrylate, alkoxylated lauryl acrylate, methoxy polyethylene glycol monoacrylate, tetrahydrofurfuryl methacrylate, methoxy polyethylene glycol monomethacrylate, and propoxylated trimethylolpropane triacrylate, wherein a tack of the white ink composition ranges from about 26 gram-meters to about 35 gram-meters after 60 seconds at about 1200 rpm at about 32° C., wherein a viscosity of the white ink composition is from about 500,000 millipascal-second to about 3,000,000 millipascal-second at 35° C. at a shear rate of 0.1 sec$^{-1}$, and wherein the white ink composition is in a form suitable for offset printing.

2. The white ink composition of claim 1, wherein the first plurality of the white pigment particles comprises titanium dioxide pigment particles and wherein the second plurality of the white pigment particles comprises titanium dioxide pigment particles.

3. The white ink composition of claim 1, wherein the average diameter of at least about 75% of the first plurality of white pigment particles is about 300 nanometers and wherein the average diameter of at least about 75% of the second plurality of white pigment particles is about 500 nanometers.

4. The white ink composition of claim 1, wherein a tack stability of the white ink composition is maintained for at least 10 minutes.

5. The white ink composition of claim 1, wherein the white ink composition further comprises a free radical scavenger.

6. The white ink composition of claim 1, wherein the white ink composition further comprises a filler.

7. The white ink composition of claim 1, wherein the first white colorant comprising white pigment particles is present in an amount of about 2 weight percent and the second white colorant comprising white pigment particles is present in an amount of about 20 weight percent.

8. The white ink composition of claim 1, wherein the first white colorant comprising white pigment particles is present in an amount of about 7 weight percent and the second white colorant comprising white pigment particles is present in an amount of about 30 weight percent.

9. The white ink composition of claim 6, wherein the filler is selected from the group consisting of silicates and clay.

10. A white ink composition for use in digital offset printing, the composition consisting of:
a first white colorant comprising a first plurality of white pigment particles, wherein an average diameter of at least about 40% of the first plurality of white pigment particles is in a range of about 250 nanometers to about 350 nanometers, a second white colorant comprising a second plurality of white pigment particles, wherein an average diameter of at least about 40% of the second plurality of white pigment particles is in a range of about 350 nanometers to about 550 nanometers, wherein the first white colorant comprising white pigment particles is present in an amount of about 2 weight percent to about 7 weight percent and the second white colorant comprising white pigment particles is present in an amount of about 20 weight percent to about 30 weight percent, at least one dispersant, at least one photo initiator, at least one curable compound selected from the group consisting of acrylated polyesters, acrylated polyethers, acrylated epoxies, urethane acrylates, pentaerythritol tetraacrylate, isobornyl acrylate, isobornyl tnethacіylate, lauryl acrylate, lauryl methacrylate, sodecy I acrylate, isoclecylinethacrylate, 2-phenoxyethyl acrylate, isooctylacrylate, isooctylmethacrylate, butyl acylate, alkoxylated lauryl acrylate, methoxy polyethylene glycol monoacrylate, tetrahydrofurfuryl methacrylate, methoxy polyethylene glycol monotnethacrylate, and propoxylated trimethylolpropane triacrylate, optionally at least one filler, and optionally at least one free radical scavenger, wherein a tack of the white ink composition ranges from about 26 gram-meters to about 35 gram-meters after 60 seconds at about 1200 rpm at about 32° C.

11. The white ink composition of claim 10, wherein the first plurality of the white pigment particles comprises titanium dioxide pigment particles and wherein the second plurality of the white pigment particles comprises titanium dioxide pigment particles.

12. The white ink composition of claim 10, wherein the average diameter of at least about 40% of the first plurality of white pigment particles is in the range of about 250 nanometers to about 350 nanometers and wherein the average diameter of at least about 40% of the second plurality of white pigment particles is in the range of about 500 nanometers to about 550 nanometers.

13. The white ink composition of claim 10, wherein the average diameter of at least about 75% of the first plurality of white pigment particles is about 300 nanometers and wherein the average diameter of at least about 75% of the second plurality of white pigment particles is about 500 nanometers.

14. The white ink composition of claim 10, wherein a tack stability of the white ink composition is maintained for at least 10 minutes.

15. The white ink composition of claim 10,
wherein the at least one curable compound includes a first acrylated polyester oligomer, a second acrylated polyester oligomer that is different from the first acrylated polyester oligomer; and a propoxylated trimethylolpropane triacrylate monomer.

16. The white ink composition of claim 10, wherein the filler is selected from the group consisting of silicates and clay.

17. A white ink composition for use in digital offset printing, comprising:
- a first white colorant comprising a first plurality of white pigment particles, wherein an average diameter of at least about 40% of the first plurality of white pigment particles is in a range of about 250 nanometers to about 350 nanometers,
- a second white colorant comprising a second plurality of white pigment particles, wherein an average diameter of at least about 40% of the second plurality of white pigment particles is in a range of about 500 nanometers to about 550 nanometers,
- wherein the first white colorant comprising white pigment particles is present in an amount of at least about 2 weight percent to about 7 weight percent and the second white colorant comprising white pigment particles is present in an amount of at least about 20 weight percent to about 30 weight percent,
- at least one dispersant,
- a photo initiator,
- at least one curable oligomer compound selected from the group consisting of acrylated polyesters, acrylated epoxies and urethane acrylates, and
- at least one curable monomer compound selected from the group consisting of isobornyl acrylate, isobornyl methacrylate, lauryl acrylate, lauryl methacrylate, isodecylacrylate, isodecylmethacrylate, 2-phenoxyethyl acrylate, isooctylacrylate, isooctylmethacrylate, butyl acrylate, alkoxylated lauryl acrylate, methoxy polyethylene glycol monoacryl ate, tetrahydrofurfuryl methacrylate, methoxy polyethylene glycol monomethacrylate, and propoxylated trimethylolpropane triacrylate,
- wherein a tack of the white ink composition ranges from about 26 gram-meters to about 35 gram-meters after 60 seconds at about 1200 rpm at about 32° C.,
- wherein a viscosity of the white ink composition is from about 500,000 millipascal-second to about 3,000,000 millipascal-second at 35° C. at a shear rate of 0.1 $sec^{-1}$, and
- wherein the white ink composition is in a form suitable for offset printing.

* * * * *